(12) United States Patent
Cloutier et al.

(10) Patent No.: US 6,446,382 B1
(45) Date of Patent: Sep. 10, 2002

(54) COMBINED FISHING TACKLE HOLDER AND FOOD COOLER

(76) Inventors: Robert J. Cloutier, 795 River Rd., Windham, ME (US) 04062; Steven Hebert, 23 Whitcomb St., Springfield, VT (US) 05156; Gerard Allain, Box 303, Buctouch, NB E4G 3C4 (CA)

(*) Notice: Subject to any disclaimer, the term of this patent is extended or adjusted under 35 U.S.C. 154(b) by 0 days.

(21) Appl. No.: 09/842,427

(22) Filed: Apr. 27, 2001

(51) Int. Cl.[7] .............................................. A01K 97/05
(52) U.S. Cl. .................................... 43/54.1; 43/57.1
(58) Field of Search ............................... 43/54.1, 57.1, 43/21.2; 206/315.11

(56) References Cited

U.S. PATENT DOCUMENTS

| | | | | |
|---|---|---|---|---|
| 4,128,170 A | * | 12/1978 | Elliott | 43/54.1 |
| 4,353,182 A | * | 10/1982 | Junkas et al. | 43/54.1 |
| 4,841,661 A | * | 6/1989 | Moore | 43/54.1 |
| 5,100,198 A | * | 3/1992 | Baltzell | 43/54.1 |
| 5,305,544 A | * | 4/1994 | Testa, Jr. | 43/54.1 |
| 5,471,779 A | * | 12/1995 | Downey | 43/54.1 |
| 5,636,469 A | * | 6/1997 | Pizzolo et al. | 43/54.1 |
| 5,704,158 A | * | 1/1998 | Whiteaker | 43/54.1 |
| 5,836,103 A | * | 11/1998 | Taylor | 43/54.1 |
| 5,864,981 A | * | 2/1999 | Zeman | 43/54.1 |
| 5,938,023 A | * | 8/1999 | Herron et al. | 43/54.1 |
| 5,996,272 A | * | 12/1999 | Raff | 43/54.1 |
| 6,014,833 A | * | 1/2000 | Benavidez | 43/54.1 |

* cited by examiner

*Primary Examiner*—Peter M. Poon
*Assistant Examiner*—Joan Olszewski
(74) *Attorney, Agent, or Firm*—John J. Welch, Jr., Esq.

(57) ABSTRACT

A combined fishing tackle holder and food cooler consisting of a cabinet component atop each of four corner legs each amenable to threadably receiving a spike based screw component which cabinet component has a wholly insulated hollow center space and a bipartite lid with insulating material on the bottom thereof as well as holding a plurality of drawers amenable to opening and closing within each lateral side of the cabinet component and further which cabinet component holds two cupholders, each one slideably openable in each upper anterior corner thereof as well as holding a pair of velcro hook and fastener components on the posterior side thereof and a fishing pole support unit affixed to an anterior side thereof which fishing pole support unit contains each of two pole holder units.

1 Claim, 12 Drawing Sheets

COMBINED FISHING TACKLE HOLDER AND FOOD COOLER

CROSS REFERENCES TO PRIOR OR PARENT APPLICATIONS

There are no prior or parent applications to which the instant invention relates.

FEDERALLY SPONSORED RESEARCH AND DEVELOPMENT

There is no federally sponsored research and development to which the instant invention relates.

BACKGROUND OF THE INVENTION

1. Field of the Invention

The instant invention relates to those particular devices suitable for storing fishing tackle and cold foodstuffs at one and the same time.

2. Prior Art

There is herewith submitted an Informational Art Statement with regards to arguably related art that however does not anticipate the instant invention.

A SUMMARY OF THE INVENTION

1. A Brief Description of the Invention

The instant invention consists of a cabinet component. The lid of the cabinet is bipartite. An inferior part of the lid serves as a place to sit available to a fisherman, and a superior part thereof is a back support device for the benefit of sitting fishermen. The bottom side of the inferior part of the lid is characterized by the presence of insulating material such as cork. The inner aspect of the cabinet component is a hollow and everywhere lined with such insulating material serving the purpose of holding food and beverages within an insulated compartment. A plurality of drawers on each side of the cabinet component serve to hold various items of paraphernalia essential to the conduct of a fishing enterprise such as hooks, flys, extra reels, pole-line, etc. Within the cabinet component at upper anterior corners thereof are each of two cupholders that slide into and out of the body of the cabinet component. A fishing pole holder is attached to the front side of the cabinet component. On the outside of the cabinet component there is to be found a pair of velcro hook and strapping units that serve to hold a fishing pole in place before and after the occurrence of an actual fishing undertaking. There are four corner legs found at the base of the cabinet component. Each leg has a centrally positioned threshold non-through hole into which a screw, the base of which tapers to a sharp point can be threaded.

2. An Object of the Invention

The instant invention is very useful to fishermen who wish to store their tackle and their rod as well as their food and beverages to be ingested during the course of a fishing trip in only one container in the interest of advancing consideration of efficiency and simplicity of carriage. It is also very useful for purposes of enabling them to have their poles held for prolonged periods of time during the course of such a trip, to wit, dependably, for as long as they wish. Cupholders built into the instant invention serve to militate against beverage spillage upon uneven ground next to a brook or stream or lake. Finally, the instant invention is not only useful and unquestionably unique, since, given the capabilities of the spike ended screws that are threadably receivable by the legs of the cabinet component, the instant invention can be used not only adjacent lakes, brooks or streams in warm weather but also on ice in very cold weather.

Respectfully submitted, in view of the foregoing, the instant invention is not only new and unique, but is also unquestionably useful as well.

A Description of the Preferred Embodiments

Figure 1:
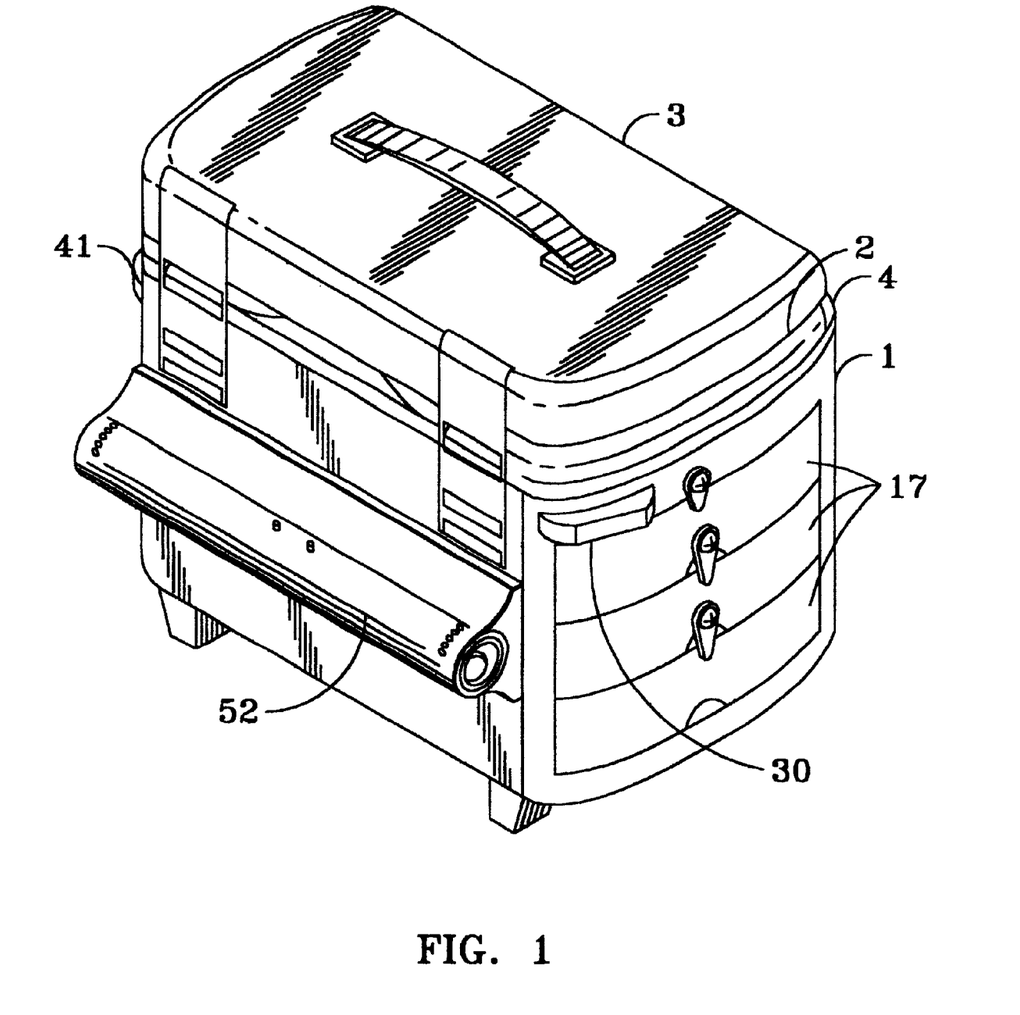
FIG. 1 is a perspective view of the instant invention.
Figure 2:
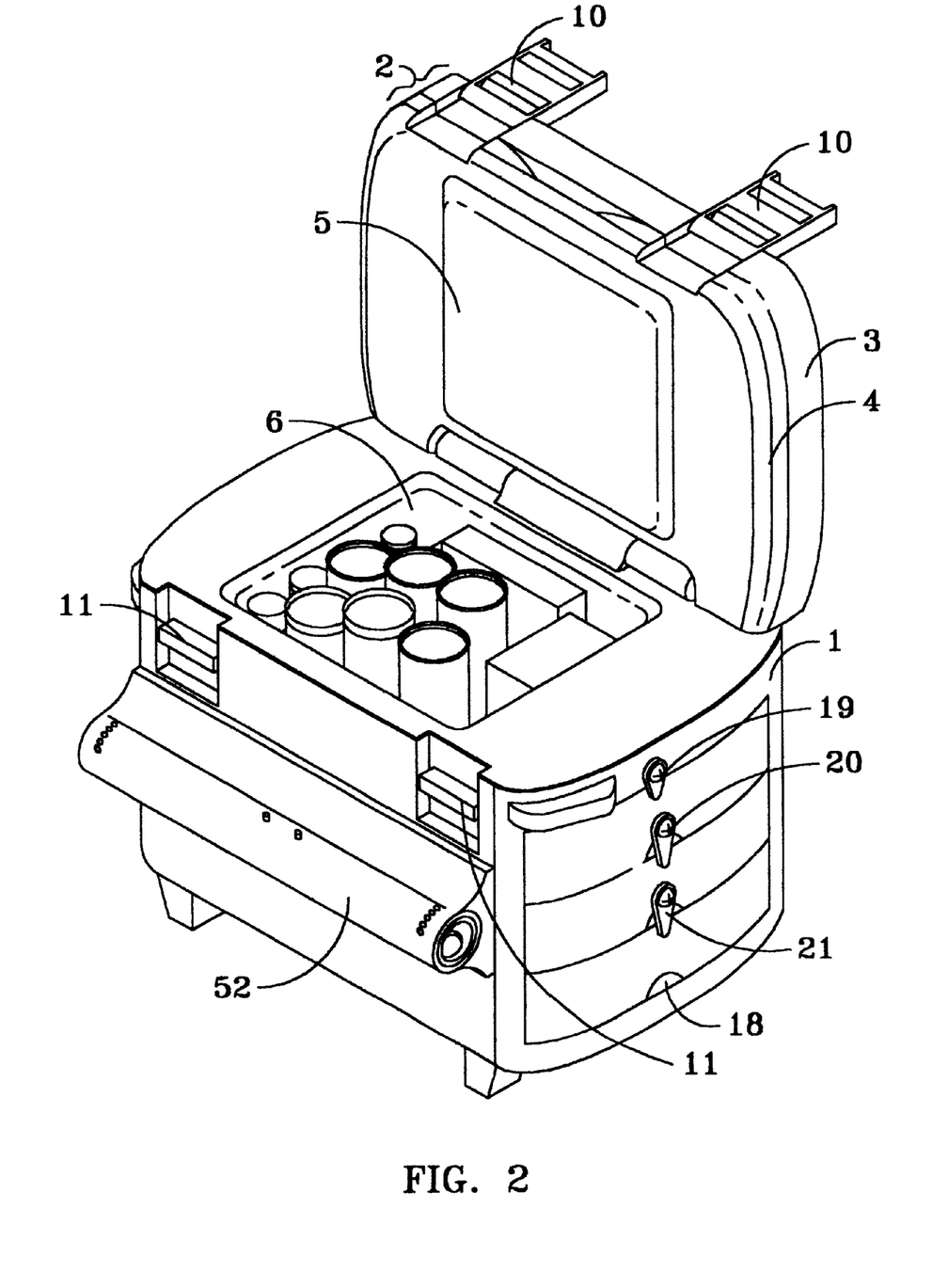
FIG. 2 is a perspective view of the instant invention with its bipartite lid component shown in the open position.

FIG. 1 is a perspective view of the intact invention shown closed. FIG. 2 is a perspective view of the intact invention shown open. In FIG. 2, cabinet component 1 is seen.

Figure 3:
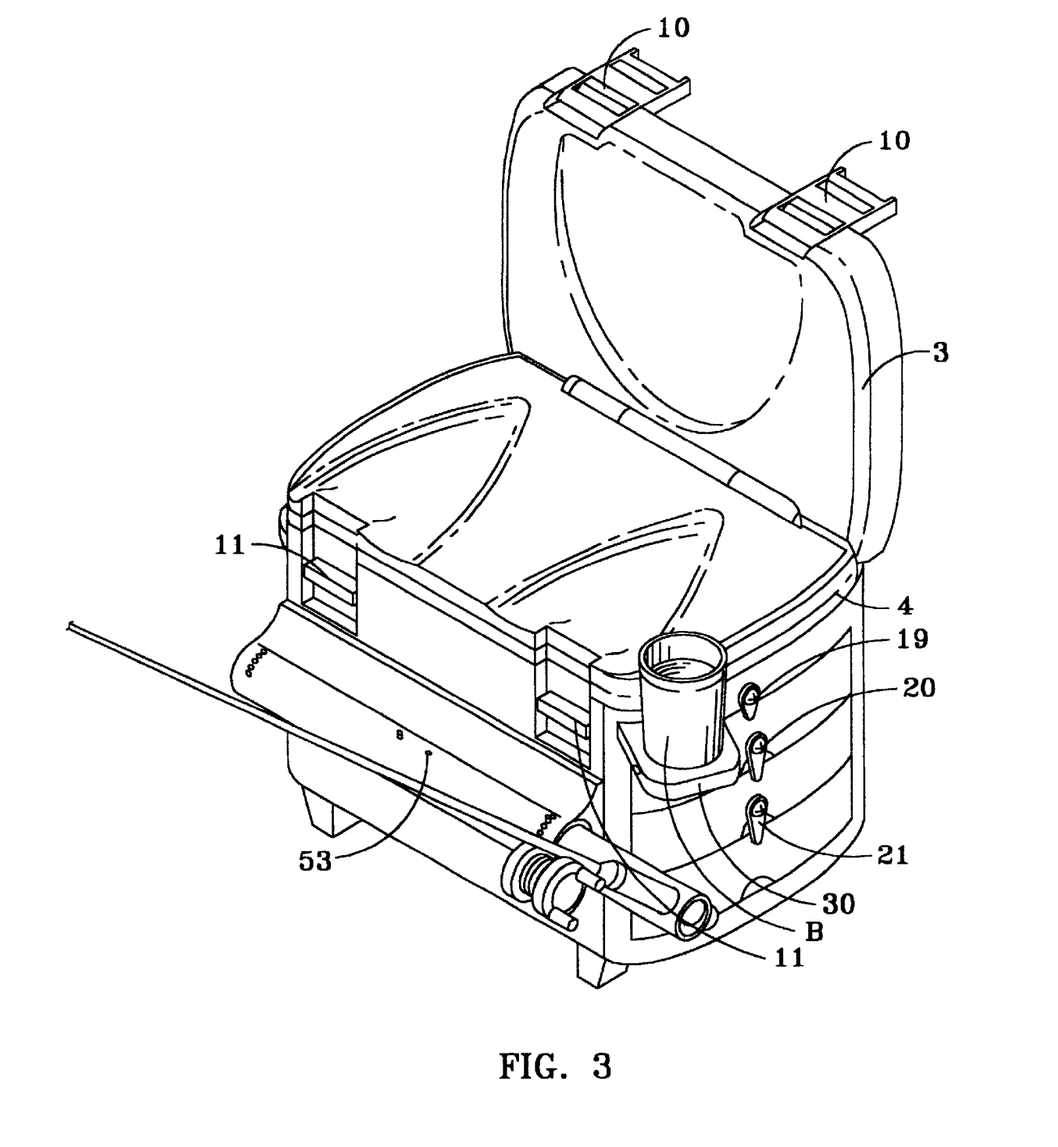
FIG. 3 is a perspective view of the instant invention with the superior part only of its bipartite lid component shown in the open position.
Figure 8:
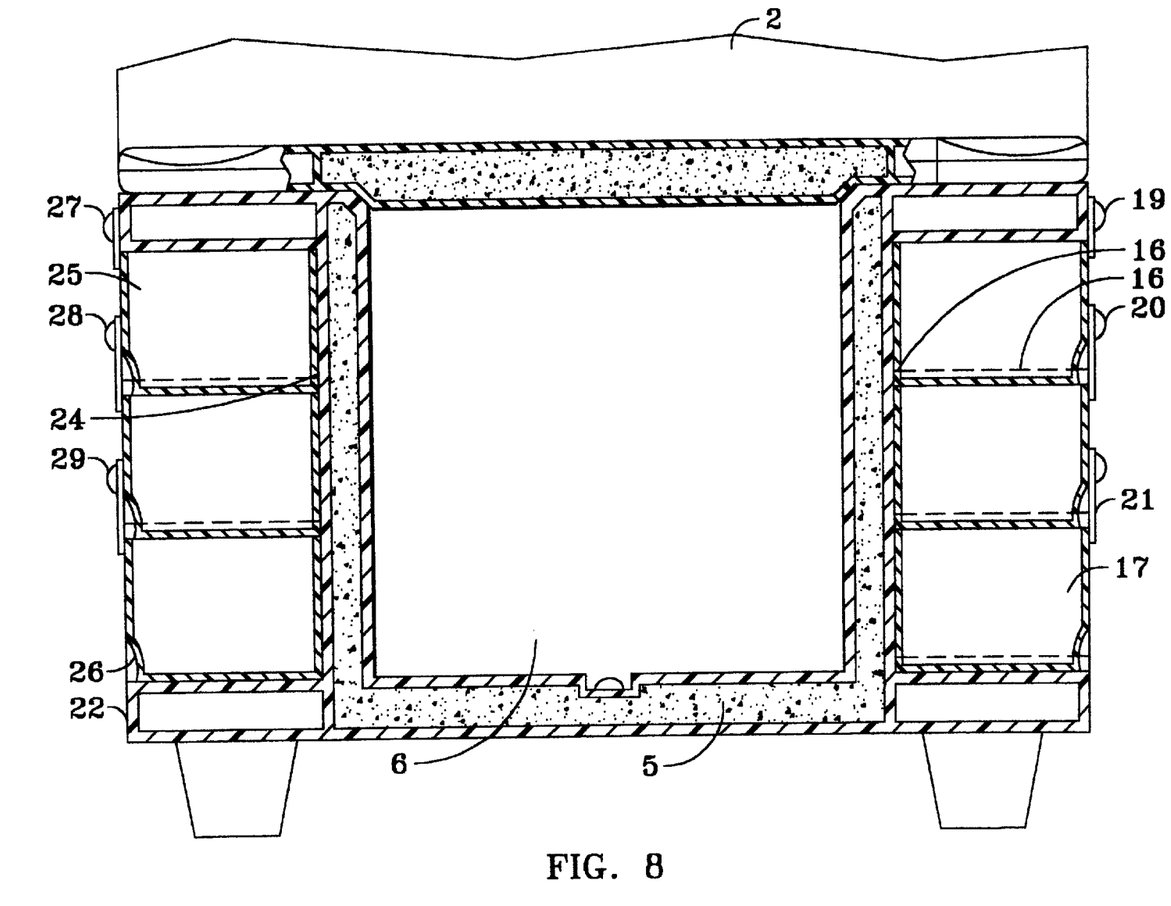
FIG. 8 is a frontal cross-sectional view of the cabinet component of the instant invention.

Bi-partite lid 2 is shown hingeably attached to a posterior edge of the topside of cabinet component 1. Bi-partite lid 2 consists of a superior lid unit 3 and an inferior lid unit 4. Bi-partite lid 2 as per FIG. 3 serves to enable a fisherman to sit atop the invention if that fisherman wishes to do so. The bottom side of inferior lid unit 4 is lined in part with insulating material 5, for example, a cork material. A hollow cavitation 6 within cabinet component 1 serves to facilitate storage of food and beverages during the course of a fishing trip. Insulating material 5 as seen in FIG. 8 engulfs hollow cavitation 6 so as to preserve the freshness and coolness of such food and beverage items. FIGS. 18, 19, 20 and 21 serve to illustrate the four equivalent legs 7, one each located at a corner of the bottom side of cabinet component 1. Within the body of each leg is a threaded closed centerhole 8 serving to receive the threaded upper portion of a spike based screw unit 9. There are 4 such spikebased screw units 9 for insertion one each into one of the threaded closed centerholes 8. This leg-spikebased screw complex provides great positional stability to the invention when it is, for example, placed on ice during the course of an ice-fishing expedition. First locking means 10 as seen in FIG. 3 are affixed to superior lid unit 3 and inferior lid unit 4 and are conjoinable with second locking means 11 affixed to the front side of cabinet component 1 as a means of locking bipartite lid 2 down onto the top side of cabinet component 1.

Figure 9:
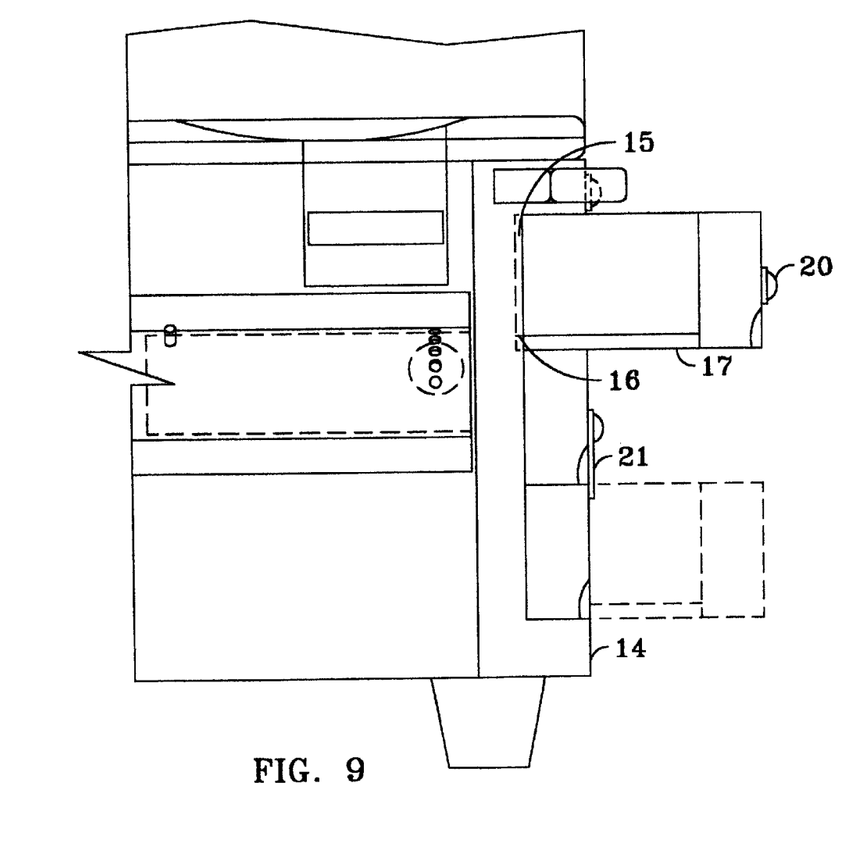
FIG. 9 is an isolated frontal plan view of the right side of the cabinet component of the instant invention showing two of its laterally positioned drawers in open positions.
Figure 16:
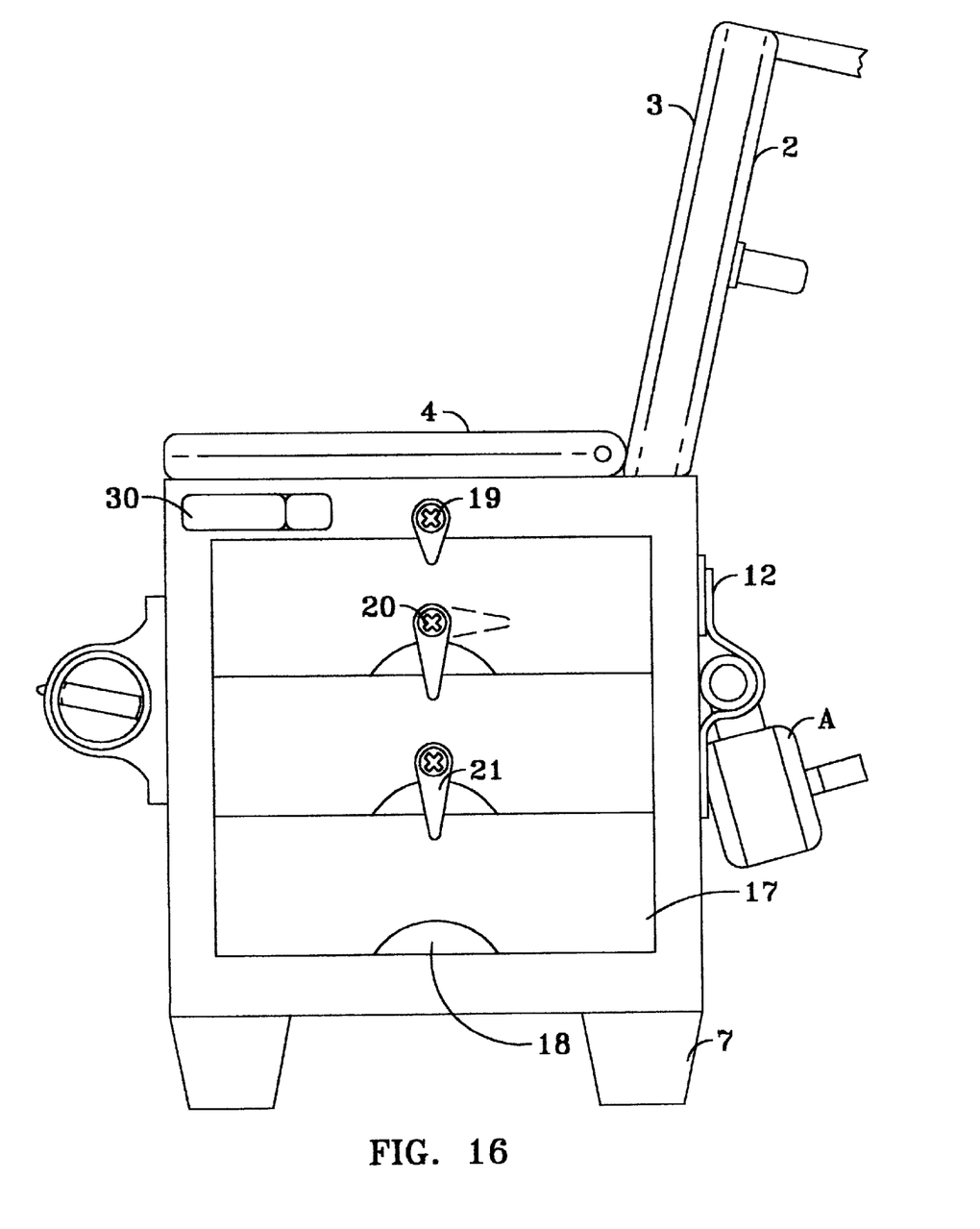
FIG. 16 is a lateral plan view of the instant invention.
Figure 17:
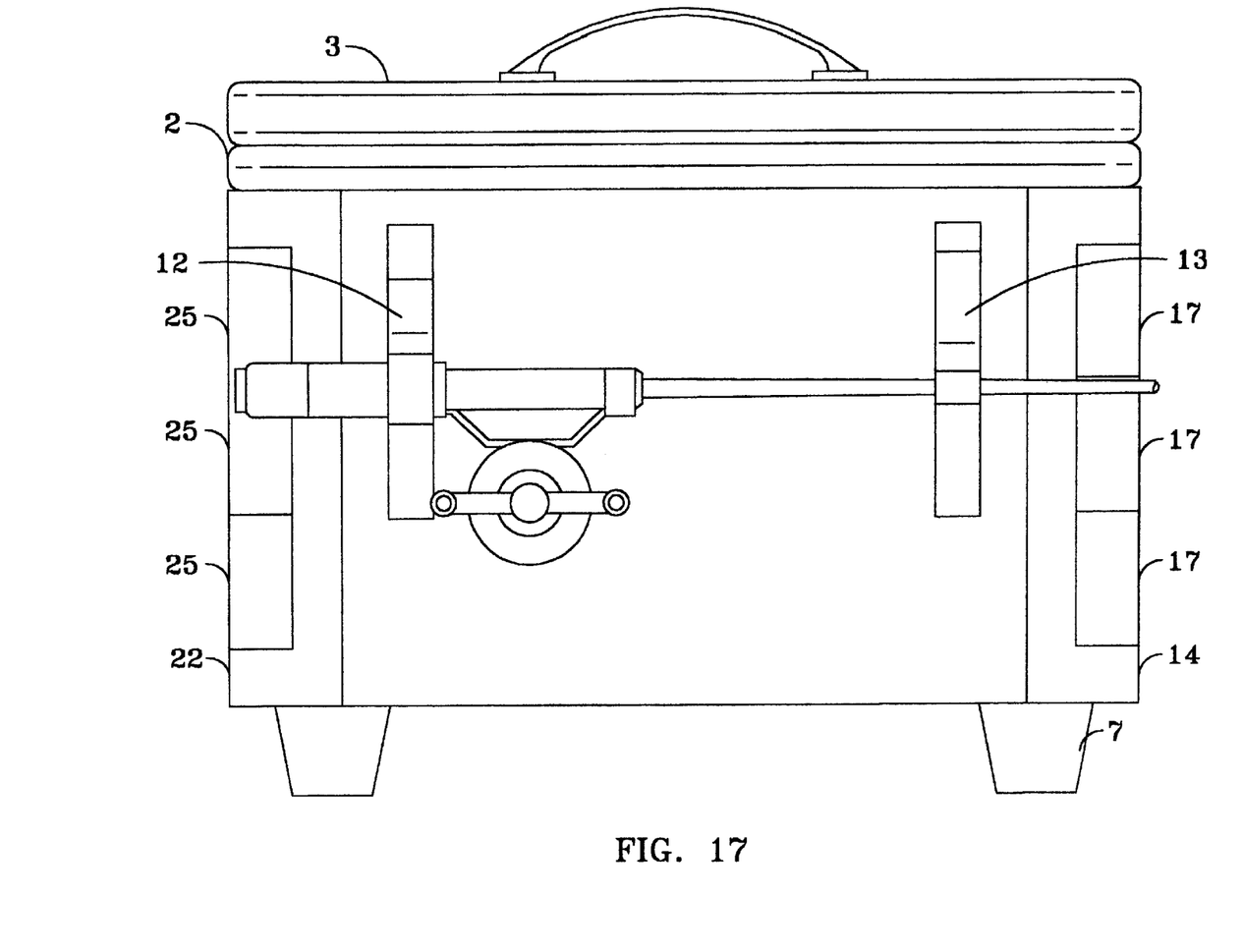
FIG. 17 is a rear plan view of the instant invention.
Figure 18:
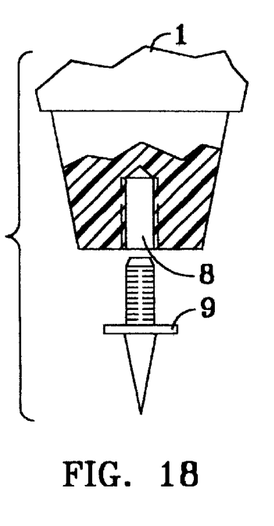
FIG. 18 is an isolated cross-sectional view of one of the four legs of the instant invention in apposition to a spike based screw component.
Figure 19:
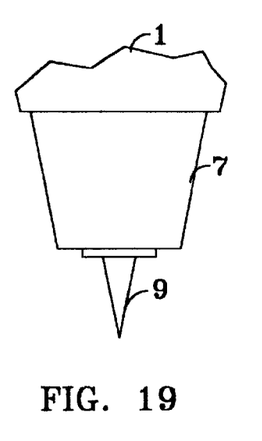
FIG. 19 is an isolated frontal view of one of the four legs of the instant invention threadably conjoined with a spike based screw component of the instant invention.
Figure 20:
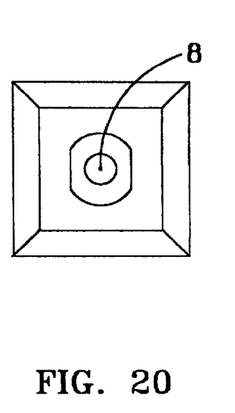
FIG. 20 is a bottom plan view of what is seen in FIG. 19.
Figure 21:
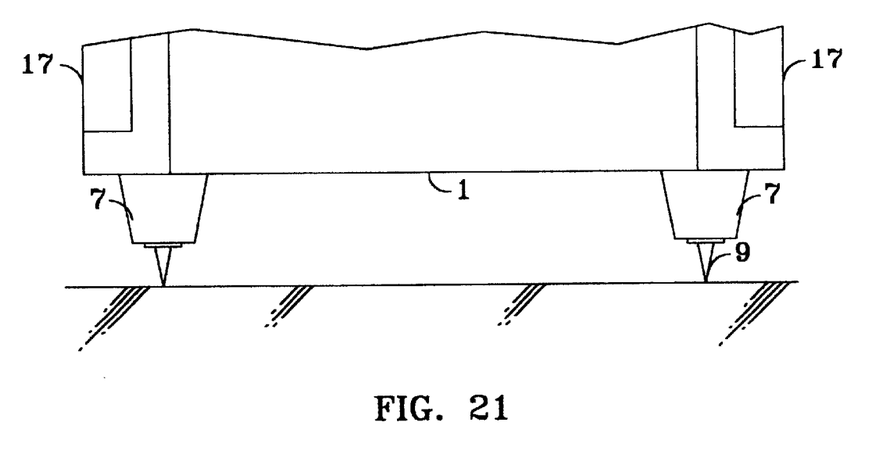
FIG. 21 is an isolated frontal plan view of the two of the four legs of the instant invention each conjoined with a spike based screw component.

First hook and fastener means 12 and second hook and fastener means 13 as depicted on FIGS. 16 and 17 are affixed to the posterior side of cabinet component 1 and serve to hold a fishing pole A fast to the posterior side of cabinet component 1 thereby facilitating ready and convenient transportation of a fishing pole A during the course of a fishing trip. First lateral side 14 of the invention within which there is first lateral cavitation 15 is characterized by the presence of a plurality of first drawer seating running supports 16 affixed to lateral inner walling and posterior walling of first lateral cavitation 15 as can be noted with reference to FIGS. 4, 8 and 9. A first plurality of longitudinally arranged hollow drawer units 17 for storing fishing tackle; hooks, flys, etc., as seen in FIGS. 9 and 11 are each slideably insertable upon drawer seating running supports 16. A closed grasping hole 18 as seen, for example in FIG. 2 is found in the front side of each of drawer units 17. First latch 19, second latch 20 and third latch 21 are each swivelably attached to respectively, first lateral side 14 just above the highest positioned one of drawer units 17 as respects latch 19 and to the front sides of drawer units 17 from the highest to the next highest positioned one of them as respects latches 20 and 21, all as can be seen with reference to FIGS. 2, 3, 8 and 9. These latches 19, 20 and 21 serve to hold in place the drawer units 17 respectively positioned just below the positioning of the latches. A second lateral side 22 of the invention containing a second lateral cavitation 23 and a plurality of second drawer seating running support units 24 affixed to said lateral inner walling and posterior inner walling of second lateral cavitation 23 functions to hold a second plurality of longitudinally arranged hollow drawer units 25 for storing fishing tackle, hooks, flys, etc., each of which are slideably insertable upon said support units 24 located within second lateral cavitation 23 as can be noted with reference to FIGS. 4, 8 and 10.

Figure 4:
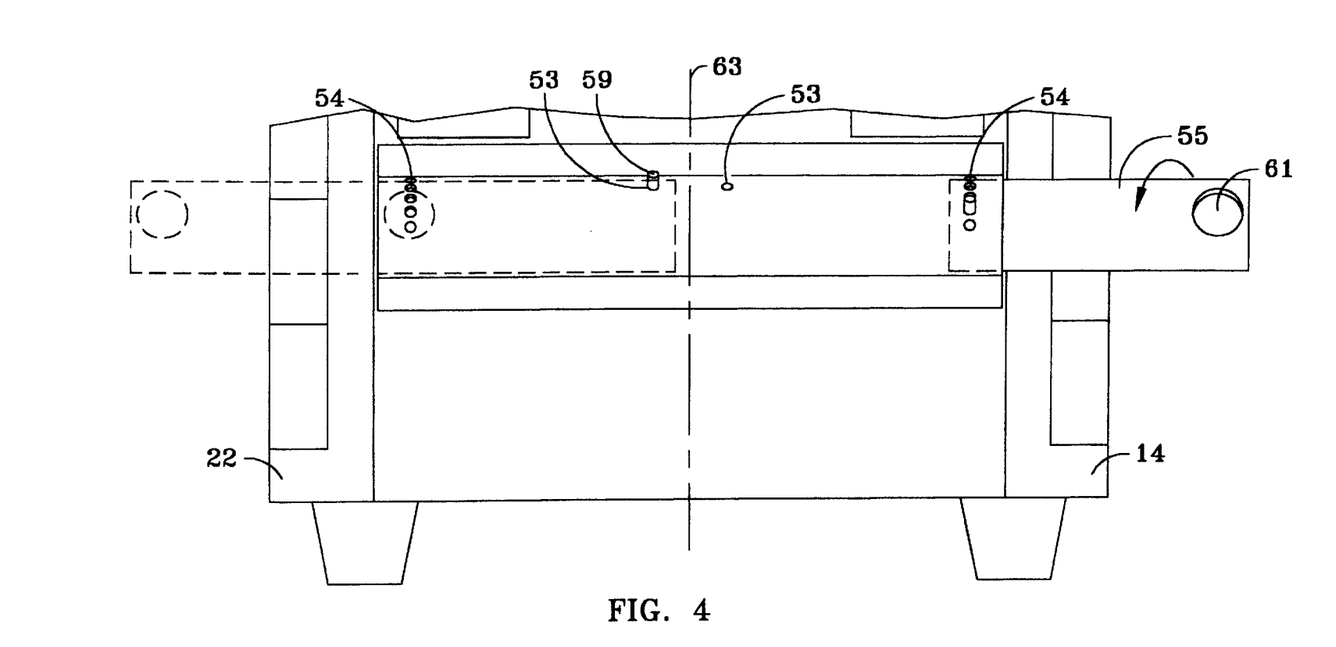
FIG. 4 is an isolated frontal plan view of the instant invention with reference to its fishing pole holder component.
Figure 7:
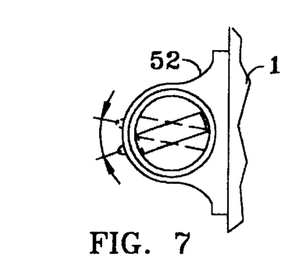
FIG. 7 is an end plan view of the right side of the fishing pole holder component.
Figure 10:
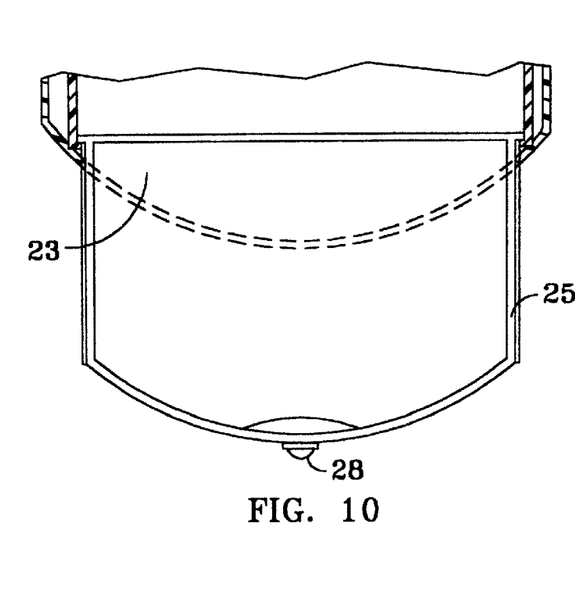
FIG. 10 is a top plan view of one of the laterally positioned drawers in an open position.
Figure 11:
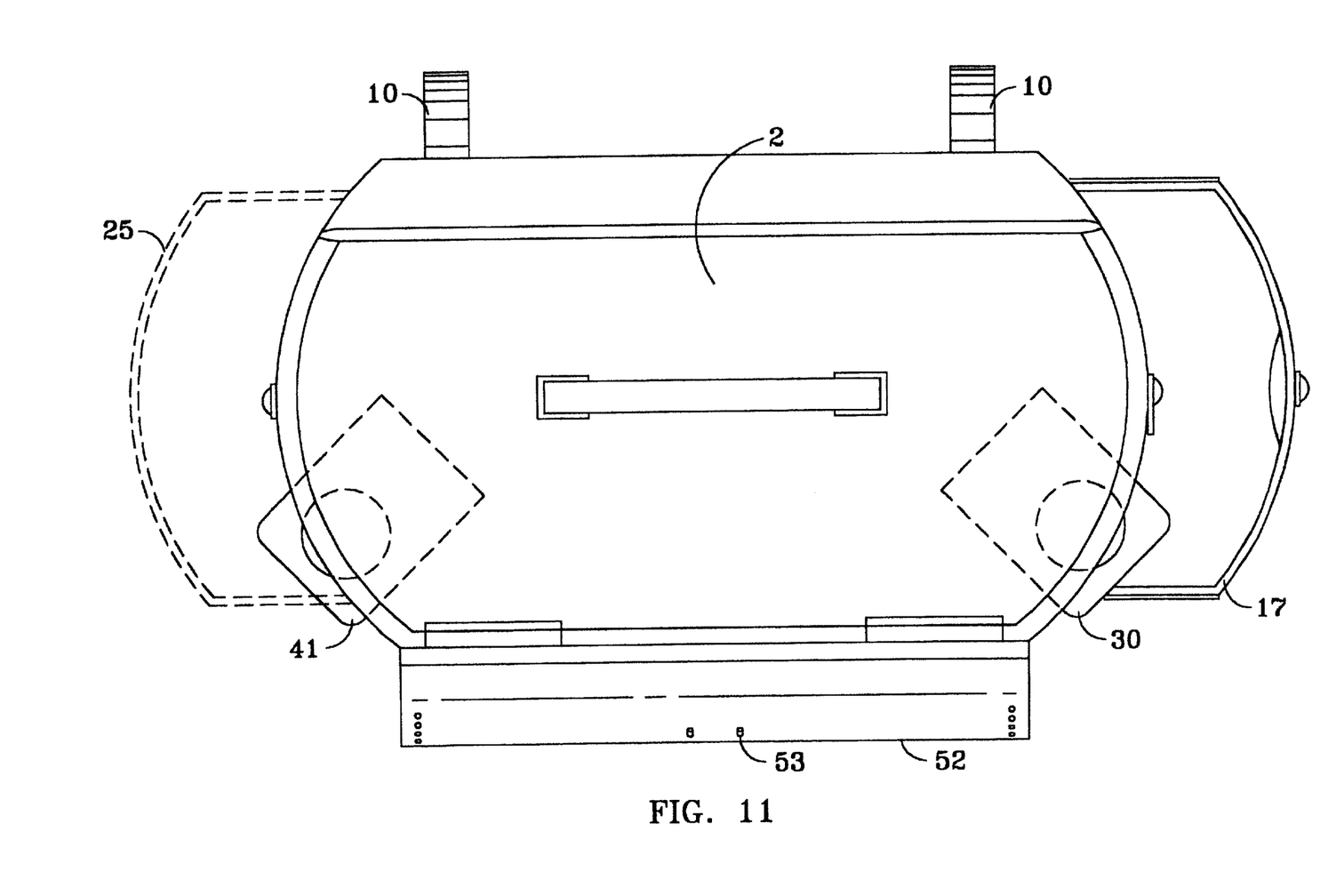
FIG. 11 is a top plan view of the instant invention.
Figure 12:
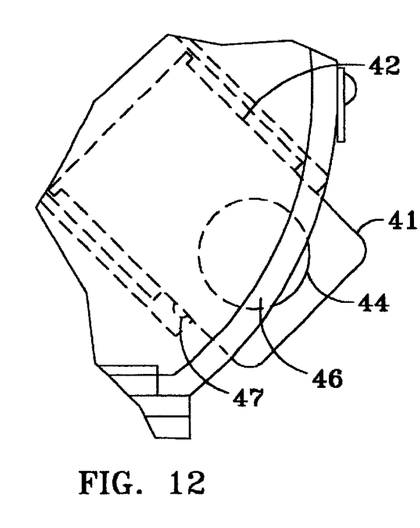
FIG. 12 is an isolated top plan view of that portion of the instant invention housing one of its two cupholders in a closed position.
Figure 13:
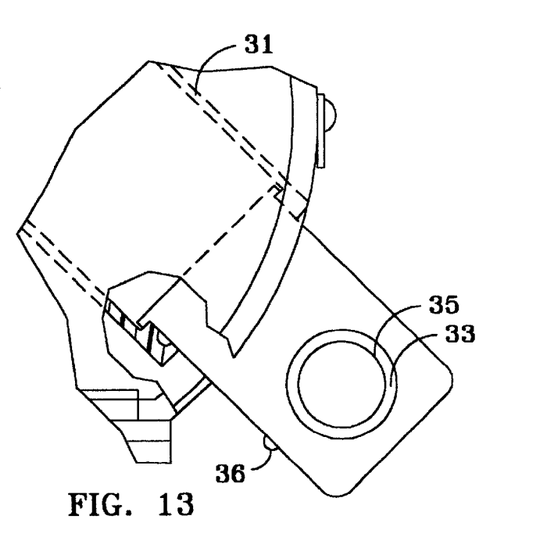
FIG. 13 is an isolated top plan view of that portion of the instant invention housing the other one of its two cupholders in an open position.
Figure 14:
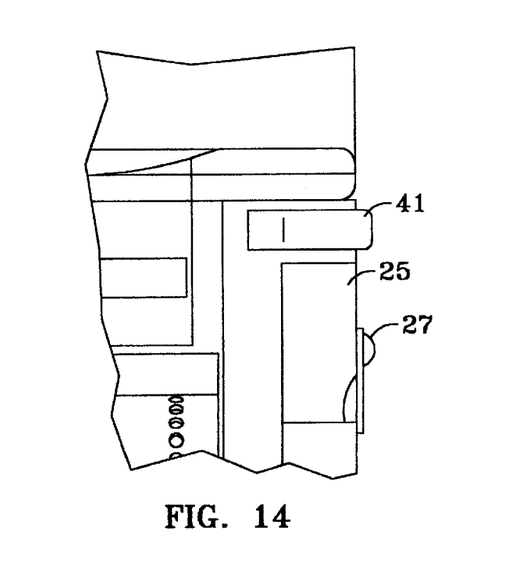
FIG. 14 is an isolated frontal view of one of the two cupholders of the instant invention in a closed position.
Figure 15:
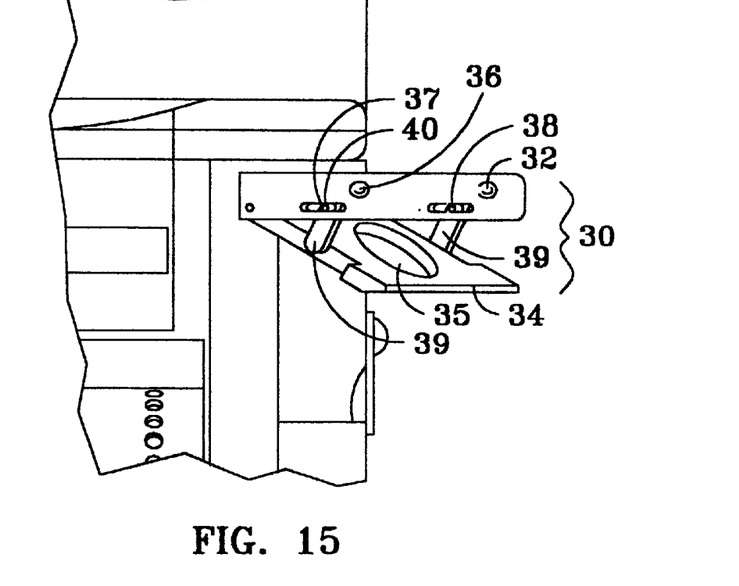
FIG. 15 is an isolated frontal view of one of the two cupholders of the instant invention in an open position.
Figure 15A:
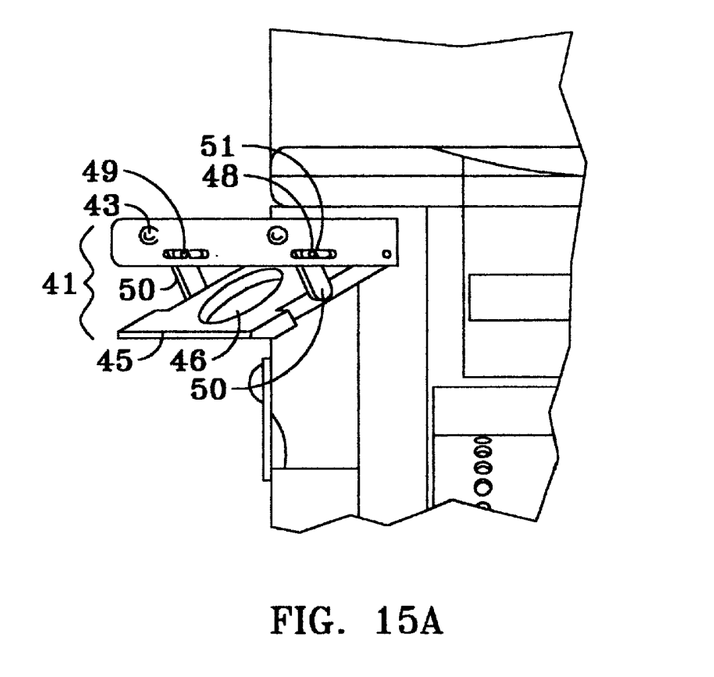
FIG. 15A is an isolated frontal view of the other one of the two cupholders of the instant invention in an open position.

These hollow drawer units 25 are each characterized by the presence of a closed grasping hole 26 in front sides thereof A fourth latch 27, a fifth latch 28 and a sixth latch 29 are all swivelably attachable respectively to second lateral side 22 above a top edge of the highest positioned one of hollow drawer units 25 as respects latch 27, to a front side of the highest positioned one of hollow drawer units 25 as respects latch 28 and to a front side of the next highest positioned one of hollow drawer units 25 as respects latch 29 all as can be seen with reference to FIG. 8 and FIG. 10. These latches; 27, 28 and 29 serve to hold in place the drawer units 25 respectively positioned just below the positioning of the latches. A first bipartite cupholder 30 for holding a cup B is slideably insertable into and frictionally holdable within a third hollow cavitation 31 in first lateral side 14 with reference to FIGS. 3, 11, 13, and 15. Cupholder 30 has a first superior component 32 with a hollow through hole 33 therein found. A first inferior component 34 of cupholder 30 is characterized by the presence of a hollow through hole 35, the diameter of which is less than that of through hole 33 and is hingeably attached near a rear side thereof to a rear side of first superior component 32. Through holes 35 and 33 are co-axial with one another. The differential diameters of through holes 35 and 33 facilitate stability of cup holding of, for example, hot coffee or hot soup. A spring loaded pin 36 is held in a first lateral side of first superior component 32. Solitary elliptical holes 37 and 38 are found respectively in the first lateral side and the second lateral side of superior component 32. First pegs 39 are vertically attached near bottom portions thereof respectively to first and second lateral sides of inferior component 34. Each peg 39 is characterized by the presence of a horizontally aligned cross peg 40 press fit into each peg 39. Each peg 40 is insertable into elliptical holes 37 and 38 free to move to or fro therein as bipartite cup holder 30 is pulled out of or pushed into third hollow cavitation 31. FIG. 15 evidences the foregoing with particularity. Second bipartite cupholder 41 is seen in FIGS. 11, 12 and 15A. Like first bipartite cupholder 30 it is held within a hollow cavitation 42 within second lateral side 22. This cavitation is referred to as fourth hollow cavitation 42 and it is located just above the highest positioned one of longitudinally arranged hollow drawer units 25 as seen in FIG. 11 and appreciated in FIG. 14. Reference to FIGS. 12 and 15A disclose the component parts of bipartite cupholder 41 and evidence how they are morphologically and functionally equivalent to the component parts of bipartite cupholder 30. A second superior component 43 contains a through hole 44 the diameter of which is greater than that of through hole 46 in second inferior component 45. There is a spring loaded pin 47 affixed to a first lateral side of second superior component 43 and third and fourth pegs 50 are attached near bottom portions thereof to first and second lateral sides of second inferior component 45. Elliptical holes 48 and 49 in first and second lateral sides of second superior component 43 receive cross pegs 51 horizontally positioned one each on each of pegs 50 when bipartite cupholder 41 is pulled out of or pushed into fourth hollow cavitation 42. The variable diameters of the superior and inferior through holes in cupholders 30 and 41 facilitate stable holding of cups B as seen in FIG. 3. The invention is moreover characterized by the presence of a hollow cylindrically shaped fishing pole support unit 52 that is permanently affixed to the front of cabinet component 1 as seen for example in FIGS. 2 and 7. Fishing pole support unit 52 has two open first and second pinholes 53 that are located in unit 52 equidistant from the locus of a vertically inclined central axis of symmetry 63 of unit 52 as seen in FIG. 4. There are also first and second pluralities of collinear open holes 54 near the ends of unit 52.

Figure 5:
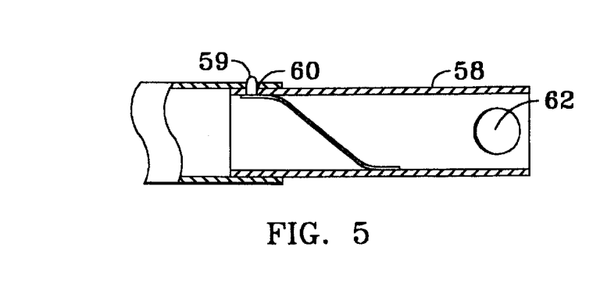
FIG. 5 is an isolated frontal cross-sectional view of the right side of the fishing pole holder component in an open holding position.
Figure 6:
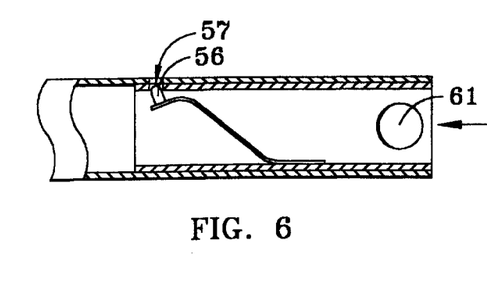
FIG. 6 is an isolated frontal cross-sectional view of the right side of the fishing pole holder component in a closed non-holding position.

Within unit 52 there is to be found a first hollow cylindrically shaped fishing pole holder 55 that has a first spring loaded pin 56 that is insertable into a first open pole holder pinhole 57 and into first open pinhole 53 when in a closed position within unit 52 as can be noted with reference to FIG. 6. Correlatively, as per FIG. 5, a second spring loaded pin 59 being a part of second hollow cylindrically shaped fishing pole holder 58 is insertable into any one of a second plurality of collinear open holes 54 just as pin 56 is insertable into any one of a second plurality of collinear open holes 54. Also, pin 59 analagously to the above described insertability of pin 56, is insertable into a second open pole holder pin hole 60 and into a second open pinhole 53 when second hollow cylindrically shaped fishing hole holder 58 is in a closed position within unit 52. The purpose of the pluralities of collinear open holes 54 is to allow the fishing pole holders; freely rotable through 360° as they are, as can be appreciated with reference to the bent arrow shown in FIG. 4 and FIG. 7 as well, to be held at any angle by their pins 56 and 59 as a fisherman may wish when the fisherman is relaxing and looking to have his pole held by either the end through holes 61 in holder 55 or the end through holes 62 in holder 58 within unit 52 as per FIG. 3.

In conclusion, as can be noted with regards to the foregoing recitations, the multiple functions of the instant invention in respect of its unique composition, as have been alluded to above, serve, respectfully submitted, to render the invention as being not merely new, useful and unique but indeed veritably revolutionary in the art of making fishing equipment and food storage items.

What is claimed is:

1. A Combined Fishing Tackle Holder and Food Cooler, comprising:
   a. a cabinet component;
   b. a bi-partite lid hingeably affixed to a posterior edge of a top side of said cabinet component;
   c. said bipartite lid consisting of a superior lid unit and an inferior lid unit each amenable to separation from one another except at said posterior edge;
   d. a bottom side of said inferior lid unit being partially lined with insulating material affixed thereto;
   e. a hollow cavitation with depth within said cabinet component and being open to said top side of said cabinet component;
   f. inner walling of said hollow cavitation and flooring of said hollow cavitation being everywhere lined continuously with said insulating material affixed thereto;
   g. four equivalent legs affixed one each at each of four corners of a bottom side of said cabinet component;
   h. a threaded closed centerhole in a bottom side and body of said each one of said four equivalent legs;
   i. four equivalent spike based screw units, each one of which is threadably receivable by one of said threaded closed centerholes;
   j. first locking means affixed to said superior lid unit and said inferior lid unit for locking said bipartite lid down atop said top side of said cabinet component;
   k. said first locking means being conjoinable with second locking means affixed to a front side of said cabinet component for locking said bipartite lid down atop said top side of said cabinet component;
   l. first hook and fastener means affixed to a posterior side of said cabinet component for holding a fishing pole fast to said posterior side of said cabinet component;
   m. second hook and fastener means affixed to said posterior side of said cabinet component for holding said fishing pole fast to said posterior side of said cabinet component;
   n. a first lateral cavitation in a first lateral side of said cabinet component;
   o. a plurality of first drawer seating running supports affixed to lateral inner walling and posterior inner walling of said first lateral cavitation;
   p. a first plurality of longitudinally arranged first hollow drawer units slideably insertable upon said drawer seating running supports within said first lateral cavitation;
   q. a closed grasping hole in a front side of each of said first plurality of longitudinally arranged hollow drawer units;
   r. a first latch swivelably attached to said first lateral side above a top edge of a highest positioned one of said each one of said first plurality of longitudinally arranged hollow drawer units;
   s. a second latch swivelably attached to a said front side of said highest positioned one of said each one of said first plurality of longitudinally arranged hollow drawer units;
   t. said second latch being removably attachable to a said front side of a next highest positioned one of said each one of said first plurality of longitudinally arranged hollow drawer units;
   u. a third latch swivelably attached to a said front side of said next highest positioned one of said each one of said first plurality of longitudinally arranged hollow drawer units;
   v. said third latch being removably attachable to a said front side of a lowest one of said each one of said first plurality of longitudinally arranged hollow drawer units;
   w. a second hollow cavitation in a second lateral side of said cabinet component;
   x. a plurality of second drawers seating running supports affixed to lateral inner walling and posterior inner walling of said second lateral cavitation;
   y. a second plurality of longitudinally arranged hollow drawer units slideably insertable upon said second drawer seating running supports within said second lateral cavitation;
   z. a closed grasping hole in a front side of each one of said second plurality of longitudinally arranged hollow drawer units;
   aa. a fourth latch swivelably attached to said second lateral side above a top edge of a highest positioned one of said each one of said first plurality of longitudinally arranged hollow drawer units;
   bb. a fifth latch swivelably attached to a said front side of said highest positioned one of said each one of said second plurality of longitudinally arranged hollow drawer units;
   cc. said fifth latch being removably attachable to a said front side of a next highest positioned one of said each one of said second plurality of longitudinally arranged hollow drawer units;
   dd. a sixth latch swivelably attached to a said front side of said next highest positioned one of said each one of said second plurality of longitudinally arranged hollow drawer units;
   ee. said sixth latch being removably attachable to a said front side of a lowest one of said each one of said second plurality of longitudinally arranged hollow drawer units;
   ff. a first bipartite cupholder unit being slideably insertable into and frictionally holdable within a third hollow cavitation in said first lateral side above a locus of said highest positioned one of said each one of said first plurality of longitudinally arranged hollow drawer units;

gg. said first cupholder unit having a hollow through hole in a first superior component thereof;

hh. said first cupholder having a first inferior component thereof hingeably attached at near a rear side thereof to near a rear side of said first superior component;

ii. said first inferior component having a hollow through hole within it smaller in diameter than said hollow through hole in said first superior component;

jj. said hollow through hole in said first inferior component being coaxial with said hollow through hole in said first superior component;

kk. said first superior component having a spring loaded pin in a first lateral side thereof;

ll. said first superior component having a first solitary elliptical hole in said first lateral side thereof and an equivalent and equivalently positioned second solitary elliptical hole in a second lateral side thereof;

mm. said first inferior component having a first peg vertically attached, near a bottom portion of said first peg, to a first lateral side of said first inferior component and an equivalent second peg vertically attached, near a bottom portion of said second peg, to a second lateral side of said first inferior component;

nn. each said peg having a horizontally positioned cross peg press fit into each said peg near a top portion of each said peg;

oo. each said cross peg being movably inserted one each into each of said first and second solitary elliptical holes;

pp. a second bipartite cupholder unit being slideably insertable into and frictionally holdable within a fourth hollow cavitation in said second lateral side above a locus of said highest positioned one of said each one of said second plurality of longitudinally arranged hollow drawer units;

qq. said second cupholder unit having a hollow through hole in a second superior component thereof;

rr. said second cupholder having a second inferior component thereof hingeably attached at near a rear side thereof to near a rear side of said second superior component;

ss. said second inferior component having a hollow through hole within it smaller in diameter than said hollow through hole in said second superior component;

tt. said hollow through hole in said second inferior component being coaxial with said hollow through hole in said second superior component;

uu. said second superior component having a spring loaded pin in a first lateral side thereof;

vv. said second superior component having an elliptical hole in said first lateral side thereof and an equivalent and equivalently positioned elliptical hole in a second lateral side thereof;

ww. said second inferior component having a third peg vertically attached, near a bottom portion of said first peg, to a first lateral side of said second inferior component and an equivalent fourth peg vertically attached near a bottom portion of said second peg to a second lateral side of said second inferior component;

xx. each said peg having a horizontally positioned cross peg press fit into each said peg near a top portion of each said peg;

yy. each said cross peg being movably inserted one each into each of said solitary elliptical holes;

zz. a hollow cylindrically shaped fishing pole support unit being permanently affixed to said front side of said cabinet component;

aaa. said hollow cylindrically shaped fishing pole support unit being characterized by the presence of a first open pinhole and an equivalent second open pinhole with said first open pinhole and said second open pinhole being each located equidistant from a locus of a vertically inclined central axis of symmetry of said hollow cylindrically shaped fishing pole support unit;

bbb. said hollow cylindrically shaped fishing pole support unit having a first plurality of collinear open holes located near a first end thereof and a second plurality of collinear open holes near a second end thereof;

ccc. a first hollow cylindrically shaped fishing pole holder characterized by the presence of through holes near an outer end thereof and containing within it a first spring loaded pin insertable into a first open pole holder pin hole and into said first open pinhole, in a closed position within said fishing pole support unit;

ddd. said first spring loaded pin being insertable into any one of said first plurality of collinear open holes, in an open position, within said fishing pole support unit;

eee. a second hollow cylindrically shaped fishing pole holder characterized by the presence of a pair of through holes near an outer end thereof and containing within it a second spring loaded pin insertable into a second open pole holder pin hole and into said second open pinhole, in a closed position, within said fishing pole support unit, and;

fff. said second spring loaded pin being insertable into any one of said second plurality of collinear open holes, in an open position, within said fishing pole support unit.

\* \* \* \* \*